United States Patent
Nunnink (10) Patent No.: US 9,715,612 B2
(45) Date of Patent: Jul. 25, 2017

(54) CONSTANT MAGNIFICATION LENS FOR VISION SYSTEM CAMERA

(71) Applicant: Cognex Corporation, Natick, MA (US)

(72) Inventor: Laurens Nunnink, Simpleveld (NL)

(73) Assignee: Cognex Corporation, Natick, MA (US)

( * ) Notice: Subject to any disclaimer, the term of this patent is extended or adjusted under 35 U.S.C. 154(b) by 184 days.

(21) Appl. No.: 14/139,867

(22) Filed: Dec. 23, 2013

(65) Prior Publication Data

US 2014/0183264 A1     Jul. 3, 2014

Related U.S. Application Data

(60) Provisional application No. 61/745,927, filed on Dec. 26, 2012.

(51) Int. Cl.
| | | |
|---|---|---|
| *G02B 1/06* | (2006.01) | |
| *G02B 9/06* | (2006.01) | |
| *G02B 27/02* | (2006.01) | |
| *G06K 7/10* | (2006.01) | |
| *G02B 23/00* | (2006.01) | |

(Continued)

(52) U.S. Cl.
CPC ....... *G06K 7/10831* (2013.01); *G02B 23/145* (2013.01); *G06K 7/10811* (2013.01); *G02B 3/14* (2013.01); *G02B 5/005* (2013.01); *G02B 7/021* (2013.01); *G02B 13/24* (2013.01); *G02B 15/14* (2013.01); *G02B 27/0025* (2013.01); *G02B 27/0955* (2013.01); *G06K 7/10722* (2013.01); *G06K 7/10821* (2013.01); *G06K 7/1439* (2013.01)

(58) Field of Classification Search
CPC ........... G06K 7/10722; G06K 7/10831; G06K 7/10821; G06K 7/1439; G02B 27/0025; G02B 27/0955; G02B 13/24; G02B 5/005; G02B 7/021; G02B 15/14
USPC ......... 235/454, 455, 462.01, 462.23–462.25, 235/462.32, 462.35, 462.41; 250/216, 250/227.11, 227.2, 227.28, 227.29, 566; 396/72, 79, 82; 359/440–442, 642, 665, 359/740, 794, 800, 802, 809, 810
See application file for complete search history.

(56) References Cited

U.S. PATENT DOCUMENTS

| | | |
|---|---|---|
| 5,973,852 A | 10/1999 | Task |
| 6,081,388 A | 6/2000 | Widl |

(Continued)

FOREIGN PATENT DOCUMENTS

| | | | | |
|---|---|---|---|---|
| EP | 1583354 | 10/2006 | | |
| EP | 1837689 A1 * | 9/2007 | ............... | G02B 7/08 |

(Continued)

*Primary Examiner* — Evelyn A Lester
(74) *Attorney, Agent, or Firm* — Loginov IP (57) ABSTRACT

This invention provides a lens assembly for a vision system, allowing for a constant magnification at various focal distances. The lens assembly resides movably/adjustably along the optical axis relative to the sensor. In an embodiment, the lens assembly includes a fixed rear lens and a front lens that is moved mechanically to focus the object image on the image sensor. The lens assembly can alternatively include a liquid lens that is controlled to adjust magnification with respect to a fixed front lens so as to maintain a constant system magnification. The liquid lens resides between the (fixed) front lens assembly and the image sensor and can be controlled to focus the image onto the image sensor.

15 Claims, 8 Drawing Sheets

(51) Int. Cl.
   *G02B 15/14* (2006.01)
   *G02B 13/24* (2006.01)
   *G06K 7/14* (2006.01)
   *G02B 5/00* (2006.01)
   *G02B 27/00* (2006.01)
   *G02B 27/09* (2006.01)
   *G02B 7/02* (2006.01)
   *G02B 3/14* (2006.01)

(56) References Cited

U.S. PATENT DOCUMENTS

| | | |
|---|---|---|
| 6,188,526 B1 | 2/2001 | Sasaya et al. |
| 7,296,749 B2 | 11/2007 | Massieu |
| 7,382,545 B2 | 6/2008 | Jung et al. |
| 7,436,587 B2 | 10/2008 | Feldman |
| 7,453,646 B2 | 11/2008 | Lo |
| 7,466,493 B2 | 12/2008 | Kim et al. |
| 7,710,535 B2 | 5/2010 | Nomura et al. |
| 7,742,075 B2 | 6/2010 | Kimura |
| 7,755,841 B2 | 7/2010 | Christenson et al. |
| 7,855,838 B2 | 12/2010 | Jannard et al. |
| 8,027,095 B2 | 9/2011 | Havens |
| 8,154,805 B2 | 4/2012 | Jannard et al. |
| 8,169,709 B2 | 5/2012 | Jannard et al. |
| 8,203,628 B2 | 6/2012 | Honjo et al. |
| 8,284,275 B2 | 10/2012 | Abe |
| 8,363,149 B2 | 1/2013 | Yumiki |
| 8,472,122 B2 | 6/2013 | Obu et al. |
| 8,545,555 B2 | 10/2013 | Berge |
| 8,576,390 B1 | 11/2013 | Nunnink |
| 8,794,521 B2 | 8/2014 | Joussen et al. |
| 2003/0095238 A1 | 5/2003 | Imafuku et al. |
| 2006/0047039 A1 | 3/2006 | Kato et al. |
| 2007/0216851 A1 | 9/2007 | Matsumoto |
| 2008/0055425 A1 | 3/2008 | Kuiper |
| 2008/0062529 A1 | 3/2008 | Helwegen et al. |
| 2008/0231966 A1 | 9/2008 | Hendriks et al. |
| 2008/0277477 A1 | 11/2008 | Thuries et al. |
| 2009/0072037 A1 | 3/2009 | Good et al. |
| 2009/0141365 A1 | 6/2009 | Jannard et al. |
| 2010/0039709 A1 | 2/2010 | Lo |
| 2010/0243862 A1 | 9/2010 | Nunnink |
| 2011/0176221 A1 | 7/2011 | Tanaka |
| 2011/0229840 A1 | 9/2011 | Liang et al. |
| 2011/0274372 A1 | 11/2011 | Bianchi et al. |
| 2012/0143004 A1 | 6/2012 | Gupta et al. |
| 2012/0160918 A1 | 6/2012 | Negro |
| 2012/0200764 A1 | 8/2012 | Afshari et al. |
| 2012/0261551 A1 | 10/2012 | Rogers |
| 2012/0281295 A1 | 11/2012 | Jannard et al. |
| 2013/0021087 A1 | 1/2013 | Rosset et al. |
| 2014/0183264 A1 | 7/2014 | Nunnink |
| 2014/0268361 A1 | 9/2014 | Nunnink |

FOREIGN PATENT DOCUMENTS

| | | |
|---|---|---|
| JP | 05-27165 | 2/1993 |
| JP | 2004-29685 | 1/2004 |
| JP | 2006-520007 | 8/2006 |
| JP | 2009-505543 | 2/2009 |
| JP | 2011-218156 | 11/2011 |
| WO | 2004083899 A2 | 9/2004 |
| WO | 2007020451 A2 | 2/2007 |

\* cited by examiner

CONSTANT MAGNIFICATION LENS FOR VISION SYSTEM CAMERA

RELATED APPLICATIONS

This application claims the benefit of U.S. Provisional Application Ser. No. 61/745,927, filed Dec. 26, 2012, entitled CONSTANT MAGNIFICATION LENS FOR VISION SYSTEM CAMERA, the entire disclosure of which is herein incorporated by reference.

FIELD OF THE INVENTION

This invention relates to machine vision systems and more particularly to optics for use in handheld symbology readers, and methods for use of such optics.

BACKGROUND OF THE INVENTION

Vision systems that perform measurement, inspection, alignment of objects and/or decoding of symbology (e.g. bar codes) are used in a wide range of applications and industries. These systems are based around the use of an image sensor, which acquires images (typically grayscale or color, and in one, two or three dimensions) of the subject or object, and processes these acquired images using an on-board or remote, interconnected vision system processor. The processor generally includes both processing hardware and non-transitory computer-readable program instructions that perform one or more vision system processes to generate a desired output based upon the image's processed information. This image information is typically provided within an array of image pixels each having various colors and/or intensities. In the example of a symbology (barcode) reader, the user or automated process acquires an image of an object that is believed to contain one or more barcodes. The image is processed to identify barcode features, which are then decoded by a decoding process and/or processor obtain the inherent alphanumeric data represented by the code. In other types of vision systems, various vision system tools (e.g. edge detectors, calipers, blob analysis) are employed by the system processor to detect edges and other features that allow for recognition of object features, and the determination of desired information based upon these features—for example whether the object is defective or whether it is properly aligned.

In a vision system, a key component is the vision system camera assembly. The camera assembly includes a lens (optics) and an imager (or "sensor") that provides the array of image pixel information. The vision system processor, as described above, receives the pixel data from the imager/sensor and processes it to derive useful vision system information about the imaged scene and/or object. The vision system processor and related components (e.g. data memory, decoders, etc.) can be provided within the camera assembly's housing or enclosure, or some or all of these components can be mounted remotely (e.g. within a PC, or other remote, self-contained processing system), and linked by a wired or wireless interconnect. Likewise, the camera assembly can include an on-board (internal) illuminator that typically surrounds the lens, and/or another illumination arrangement that provides light to the imaged scene.

In some vision system cameras, it is desirable to provide an automatic focus ("auto-focus") capability. Many auto-focus arrangements rely upon electromechanical actuation to move a fixed lens, while others increasingly rely upon other forms of varioptic lens designs, such as a so-called liquid-lens.

In the particular field of symbology reading using sensor-based vision systems, a common reader arrangement employs a handheld unit that is directed at an object containing a symbol (e.g. a 1D or 2D barcode). Such handheld systems are commonly employed to track inventory, for example in a warehouse or factory floor. In such environments, the distance between a symbol and the reader can be highly variable, as some objects can reside relatively close to a user, while others are disposed at a distance (e.g. an object located on a high shelf). While a ready may include a conventional auto-focus mechanism to allow it to generate a sharp image of both the close object and the far object, the symbol in the far object can appear small relative to the overall field of view given this long focal distance as the opening angle of the optics is too large. As such, the small size of the symbol in the overall image may render it difficult to properly decode due to lack of sufficient resolution when compared to the overall field that is captured by the sensor (i.e. the feature of interest/symbol is too small at distance).

It is therefore desirable to provide a vision system camera assembly that can more effectively resolve a symbol or other feature of interest at both short focal distances and long focal distance. This camera assembly should be adaptable to a handheld device and/or to a fixed-mount device.

SUMMARY OF THE INVENTION

This invention overcomes disadvantages of the prior art by providing a lens assembly for a vision system, such as a handheld symbology reader, which allows for a constant magnification at both short and long focal distances. The lens assembly resides movably and/or adjustably along the optical axis at a predetermined distance from the image sensor (located generally perpendicular to the axis). In an illustrative embodiment, the lens assembly consists of two lenses L1 and L2 separated from each other along an optical axis. In embodiments, L1 and L2 can be represented by groups of lenses. The two lenses L1 and L2 define respective focal lengths f1 and f2. The lenses satisfy the following relationships: (a) the focal points of L1 and L2 coincide; (b) the aperture stop of the assembly is between the back surface of L1 and the focal point of L1; (c) the magnification of the assembly is constant and equal to f2/f1; and (d) the shift in focal position of the assembly is $(f1/f2)^2$*(movement of the assembly along the optical axis). In an embodiment, the lens is moved to a selected position along the optical axis, and with respect to the sensor, by an actuator (e.g. a geared stepper or servo motor). The actuator moves in response to commands from the vision processor that employs a conventional or custom auto-focus process to resolve a sharp image of the feature of interest (e.g. a symbol) on an object at the prevailing focal distance. The feature of interest will appear at approximately the same resolution at each of a maximum and minimum focal distance and at all ranges therebetween. The sensor's inherent pixel resolution is sufficient at the range of operating distances to provide sufficient detail to identify and decode the symbol.

In an illustrative embodiment, a vision system for acquiring images of objects over a range of focal distances within a field of view includes an image sensor operatively connected to a vision processor. A constant magnification lens assembly, oriented along an optical axis, and including a front lens assembly, receives light from a scene and transmits the light to the image sensor. The front lens assembly is smaller in area (or associated dimensions) than an area (or associated dimensions) of the field of view, making of a practical and relatively compact package. The constant magnification lens assembly also includes a rear lens assembly. The front lens assembly and the rear lens assembly are arranged in a fixed spatial relationship therebetween. Illustratively, the front lens assembly and the rear lens assembly are constructed and arranged so that (a) a focal point of the front lens assembly and a focal point of the rear lens assembly coincide, (b) an aperture stop of the constant magnification lens assembly is between a back surface of the front lens assembly and a focal point of the front lens assembly, (c) a magnification of the assembly is constant and equal to a focal length (f2) of the rear lens assembly/a focal length (f1) of the front lens assembly, and (d) the shift in focal position of the assembly is $(f1/f2)^2$*(movement of the constant magnification lens assembly along the optical axis). This arrangement (i.e. item (b)) allows the front lens assembly to define an area and/or dimensions that are smaller than those of the imaged field of view. The front lens assembly and the rear lens assembly can be mounted in a barrel that is moved toward and away from the image sensor by an actuator responsive to a focus process. Alternatively, the constant magnification lens assembly and its components can be fixed with respect to the camera body/frame, and the sensor assembly (or a portion thereof containing the sensor) can be moved toward and away from (along the optical axis) the constant magnification lens assembly by an appropriate actuator in response to the focus process.

In an illustrative embodiment, a vision system for acquiring images of an object over a range of focal distances within a field of view comprises an image sensor operatively connected to a vision processor. A constant magnification lens assembly is oriented along an optical axis that receives light from a scene and transmits the light to the image sensor. The constant magnification lens assembly includes a liquid lens assembly oriented between the image sensor and a front lens assembly. This lens assembly can be based upon the use of at least two iso-density liquids that vary interaction based upon the principle of electro wetting, or the lens can include an actuator that changes the shape of a liquid-filled membrane. The front lens assembly comprises one or more fixed lenses, and the (rear) liquid lens assembly including an interface that employs input electrical energy to vary a magnification m2 of the liquid lens assembly. A controller selectively adjusts the magnification m2 of the liquid lens assembly to maintain focus on the object at a constant system magnification M at each focal distance of the range of focal distances. Illustratively, the front lens assembly and the rear lens assembly are constructed and arranged so that (a) a focal point of the front lens assembly and a front principal plane of the liquid lens assembly coincide, and (b) the magnification is constant and equal to a ratio between the distance (d2) from the liquid lens assembly to the image sensor and the distance (d1) between the front lens assembly and the liquid lens assembly. The controller is also arranged to iteratively adjust the magnification m2 of the liquid lens assembly until a desired focus at the constant system magnification M is provided.

Illustratively, in any embodiment herein, the front lens assembly and the liquid (or rear) lens assembly are constructed and arranged so that (a) a focal point of the front lens assembly and the front principal plane of the rear lens assembly coincide (d1=f1), (b) an aperture stop of the constant magnification lens assembly is located between a back surface of the front lens assembly and a focal point of the front lens assembly, (c) the magnification is constant and equal to a ratio between the distance (d2) from the liquid lens assembly to the image sensor and the distance (d1) between the front lens assembly and the liquid lens assembly.

In a further embodiment, a method for acquiring images of an object over a range of focal distances within a field of view includes the steps of providing an image sensor operatively connected to a vision processor and a constant magnification lens assembly oriented along an optical axis that receives light from a scene and transmits the light to the image sensor. The constant magnification lens assembly includes a front lens assembly. The constant magnification lens assembly is iteratively adjusted until the object achieves a desired focus at the image sensor.

BRIEF DESCRIPTION OF THE DRAWINGS

The invention description below refers to the accompanying drawings, of which.

DETAILED DESCRIPTION

I. General Considerations

Figure 1:
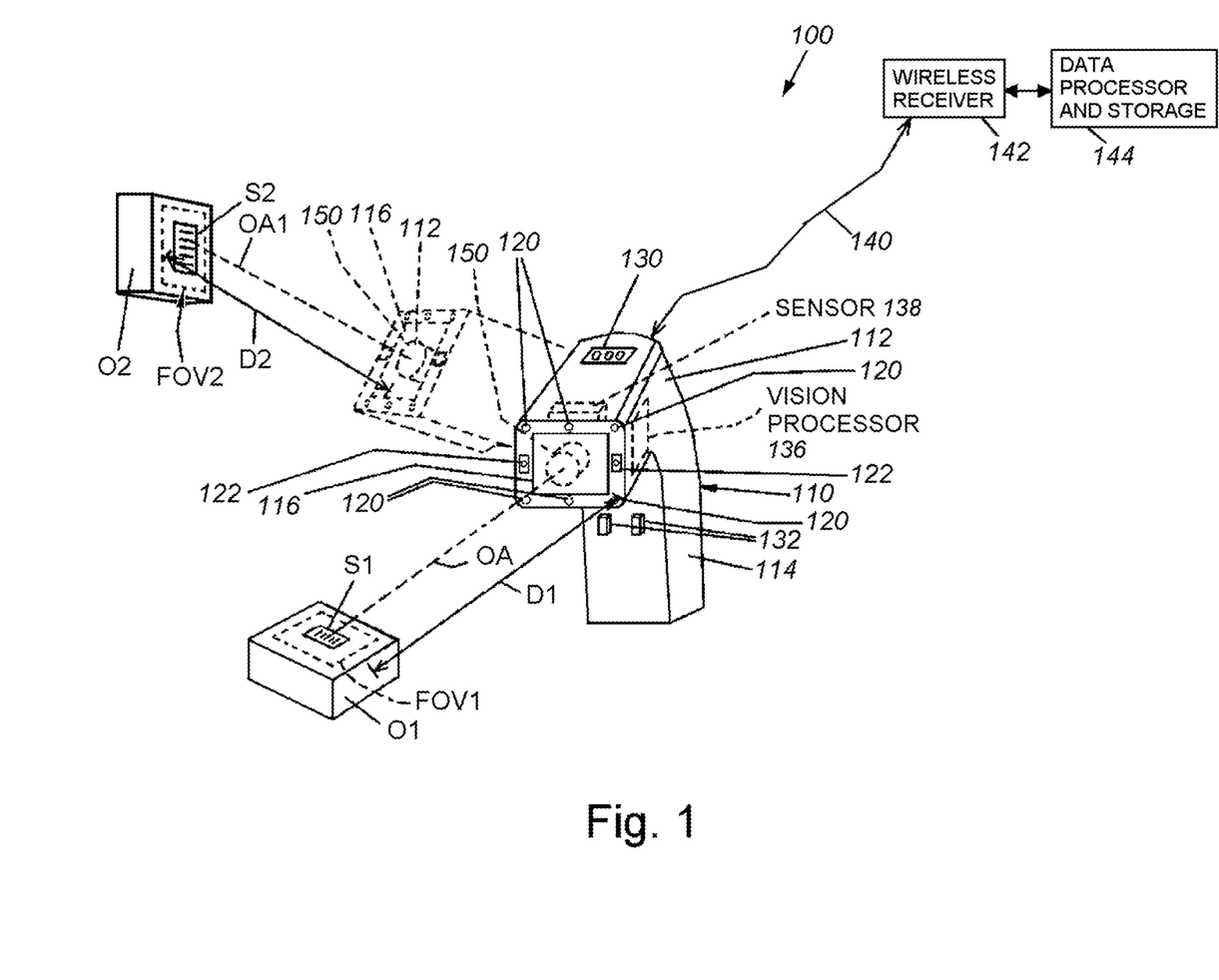
FIG. 1 is a diagram of a handheld symbology reader, and associated data processing and storage system, employing a constant magnification lens assembly according to an illustrative embodiment to acquire images of objects at a short focal distance and a long focal distance.

FIG. 1 shows a vision system 100, which includes at least one symbology reader 110 that can be handheld as shown, or fixed in a position with respect to an imaged scene. The reader can define any acceptable housing, including the depicted main body 112 and grip 114. In this embodiment, the reader includes a front window 116, which can include an external and/or internal illumination system (illuminator). The illuminator can comprise any arrangement and/or combination of lighting elements in any acceptable arrangement. In this embodiment, and by way of example, light elements (e.g. high-output LEDs) 120, 122 are employed and allow for differing color/wavelength, angle and/or intensity of illumination. The illuminator can include conventional aiming LEDs (not shown) that project a beam onto a field of view to ensure that features of interest (e.g. barcodes or other symbols, also termed "IDs") are properly and fully imaged. The reader 110 can include an indicator and interface panel 130, located at the rear of the body 112 in this embodiment. This panel can include on/off and other switches as well as lights to indicate a "good" or "failed" symbol read (i.e. success or failure in reading/decoding the symbol). The grip 114 can include one or more trigger buttons 132 that trigger illumination and image capture among other functions, such as toggling of aiming LEDs. The reader also includes one or more processing circuits, memory and the like, that are collectively shown (in phantom) as a vision processor 136. This processor performs various image processing, and image data handling/storage functions. Illustratively, the processor 136 receives captured image frame rate in the form of color or grayscale pixels (among other formats) from the image sensor (also shown in phantom). The processor searches for ID features (or other features of interest) in the image, and then passes appropriate data to a decoding process that generates codes from the ID features. These codes are stored and/or passed via a communication link (which can be wired, or wireless as shown) 140 to a receiver 142 that is interconnected via a network or other link with a data processing and storage system 144. This system 144 can comprise a conventional server or PC running appropriate applications for handling and storing code data transmitted from the reader 110. Such applications and the architecture of the system 144 should be clear to those of skill in the art.

The reader also includes a lens assembly 150 (shown in phantom behind window 116) that provides for a constant magnification over a range of focal distances. By way of example, an object O1 having a symbol S1 is imaged by the reader 110 with the lens 150 focusing upon a field of view FOV1 in which the symbol S1 occupies a relatively prominent place/scale therewithin. This scale is sufficient to allow sufficient detail for an acceptable ID reading. The focal distance D1 along optical axis OA1 is within an operating range of least approximately 350 mm, and for the purposes of the example is at a distance of approximately 500 mm. Likewise, the reader 110 can be focused (as shown in phantom) on another object O2 located at a significantly shorter focal distance D2 along optical axis OA2 that, for the purposes of the example, is approximately 50 mm. Notably, using the constant magnification lens assembly 150, in accordance with an illustrative embodiment, the scale of the second symbol S2 within the associated field of view FOV2 is approximately the same as that of S1 and FOV1. Hence, regardless of distance within a predetermined distance range, the size of the field of view and symbol therewithin remains the same, allowing for sufficient detail to obtain a good read.

Figure 2:
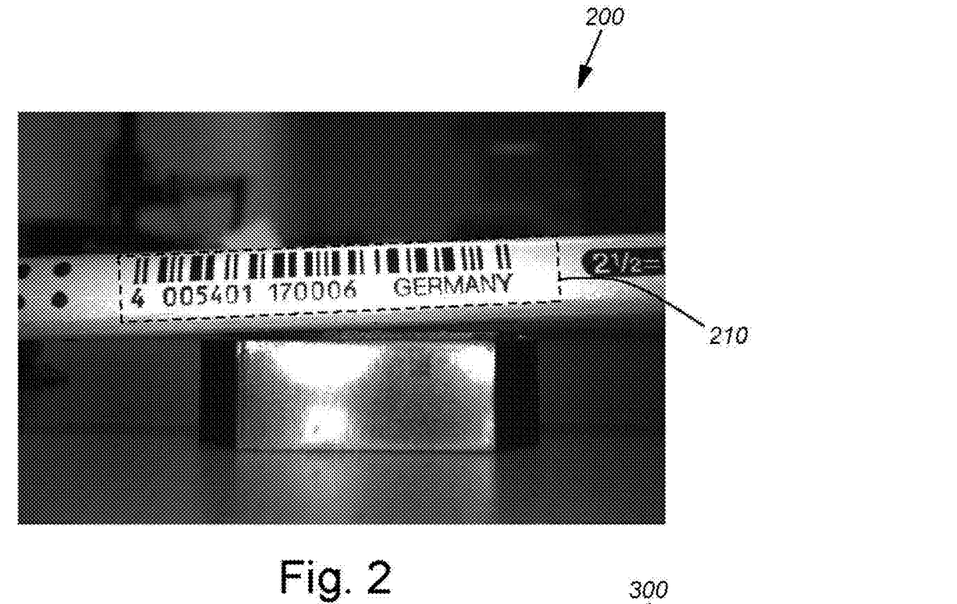
FIG. 2 is an image of a scene acquired by the image sensor of the reader of FIG. 1, showing resolution of a feature of interest at a short focal distance.
Figure 3:
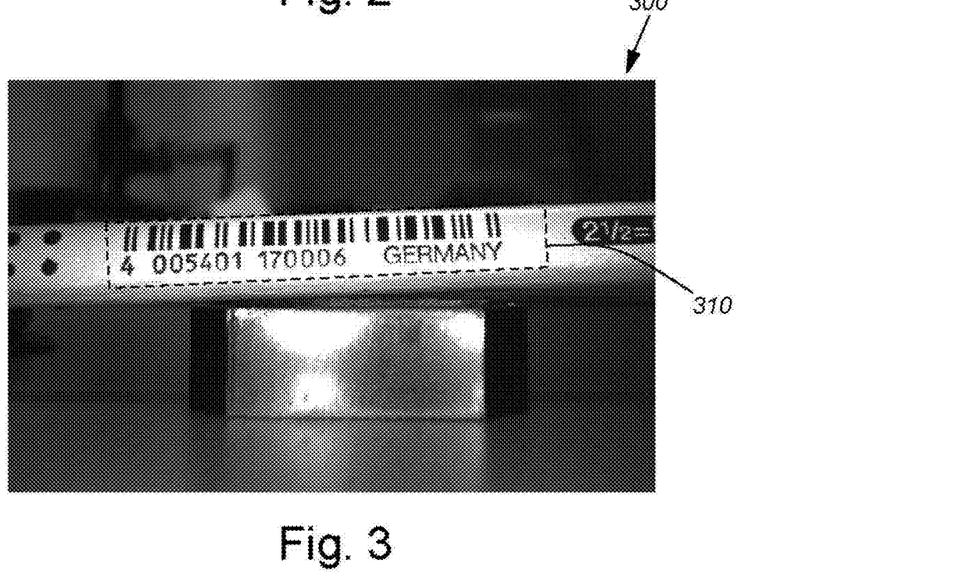
FIG. 3 is an image of a scene acquired by the image sensor of the reader of FIG. 1, showing resolution of a feature of interest at a comparatively long focal distance.

With reference to FIGS. 2 and 3, the principle of constant magnification is further illustrated by respective exemplary images 200 and 300 that simulate the appearance of images acquired, respectively, at focal distances of approximately 50 mm and 500 mm. The field of view of each image 200, 300 is defined by the outside edges of the depicted image. Using a constant magnification arrangement, both images should ideally present approximately the same boundaries relative to the scene. Likewise, each exemplary symbol region 210, 310 appears to be relatively similar in size with respect to the field of view, allowing sufficient detail for the processor to find and decode the symbol.

II. Constant Magnification with Mechanically Driven Lens

Figure 4:
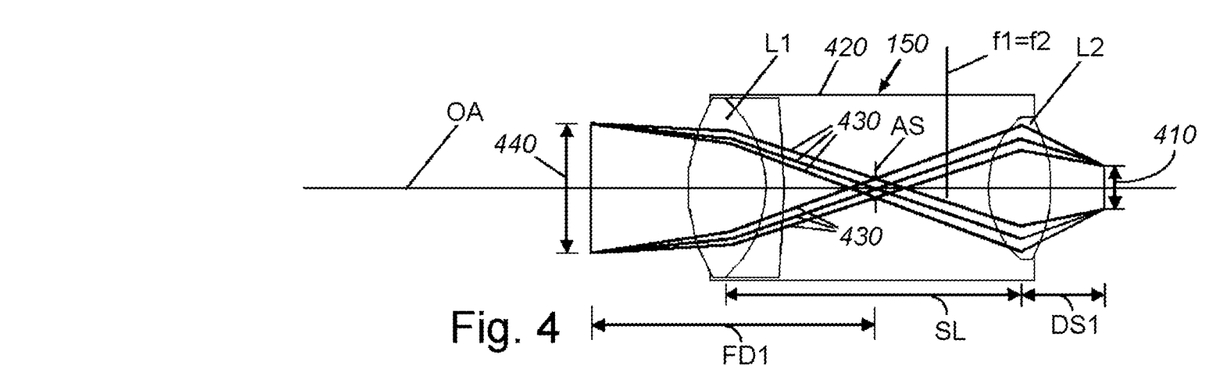
FIG. 4 is a cross section of the lens assembly for use in the reader of FIG. 1, according to an illustrative embodiment, showing the relative position of the assembly along the optical axis with respect to the image sensor for a relatively short focal distance.
Figure 5:
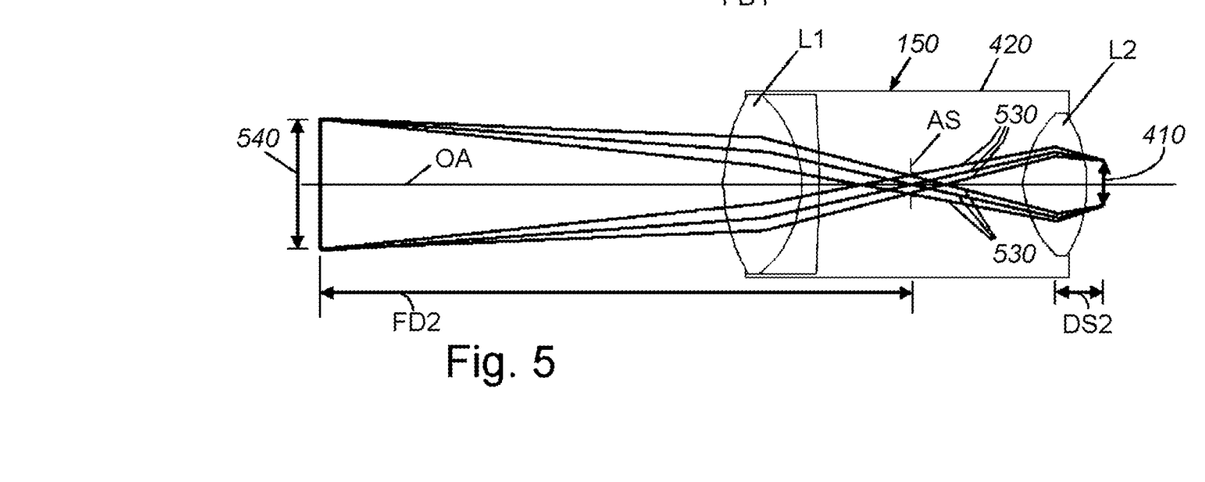
FIG. 5 is a cross section of the lens assembly shown in FIG. 4, in which the relative position of the assembly along the optical axis with respect to the image sensor is set for a longer focal distance.

Reference is now made to FIGS. 4 and 5, which show the constant magnification lens assembly 150 in further detail, according to an illustrative embodiment. The assembly 150 consists of a front lens L1 (with a focal length f1) and a rear lens L2 (with a focal length f2) aligned along the optical axis OA with respect to a sensor 410, which typically defines an image plane perpendicular to the axis OA. The lenses L1, L2 in this embodiment are positioned at a fixed distance SL with respect to each other with in barrel 420, or other supporting structure that maintains their relative alignment and spacing. Each of the two lenses L1, L2 is particularly designed to establish a set of relationships that ensure constant magnification over a range of focal distances. More particularly, these relationships are as follows:

(a) the focal points of L1 and L2 coincide at the depicted plane (d1=f1+f2);
(b) the aperture stop of the assembly (AS) is between the back surface of L1 and the focal point of L1;
(c) the magnification of the assembly is constant and equal to f2/f1; and
(d) the shift in focal position of the assembly is $(f1/f2)^2*$ (movement of the assembly along the optical axis).

Note that the placement of the aperture stop at a position defined in item (b) above is advantageous in that the size of the front lens can be smaller in diameter, area, etc., than an area, length, width, etc., the imaged object and associated field of view. Conversely, placement of the aperture elsewhere (e.g. at focal point f1), could necessitate use of a front lens approximately the size of the desired field of view—for example, in the manner of a telecentric lens. Such a large lens is typically disadvantageous where size and placement constraints exist.

Note, it is also expressly contemplated that the depicted lenses L1 and/or L2 can be defined by group(s) of lenses having similar or the same optical power as a single lens element. In various embodiments, such groups of lenses can provide improved correction of optical aberrations relative to single, discrete lens elements. Thus as used herein the term "lens" should be taken broadly to include an arrangement of a plurality of discrete lenses.

One of skill in the art of lens design should understand the construction of a lens assembly that satisfies the above relationships (a)-(d). In an embodiment, the value f2/f1 is approximately 0.1, but other ratios are expressly contemplated. Illustratively, both groups of lenses L1 and L2 define a positive optical power. By way of example, lens L1 can define a focal length between approximately 30 and 60 millimeters and lens L2 can define a focal length between approximately 6 and 10 millimeters. As shown, at a relatively short focal distance FD1 (FIG. 3), the arrangement of lenses L1, L2 in the assembly 150 defines a ray pattern 430 that diverges at a steeper angle for a given distance DS1 between the sensor 410 and the rear lens 410. This more divergent pattern defines a focus on a field of view 440 that is a desired size for appropriately imaging a feature of interest (e.g. a symbol/ID) therein.

To achieve a similarly sized field of view 540 (FIG. 5) to the field 440 at a longer focal distance FD2, the distance DS2 between rear lens L2 and sensor 410 is shortened with respect to the above distance DS1. Thus the ray pattern 530 is less divergent. Note at both focal distance the aperture stop AS is the same. Thus, by appropriately moving the distance between the rear lens and the sensor, the optical system can be brought into focus on a similarly sized field of view at a wide range of focal distances.

Figure 6:
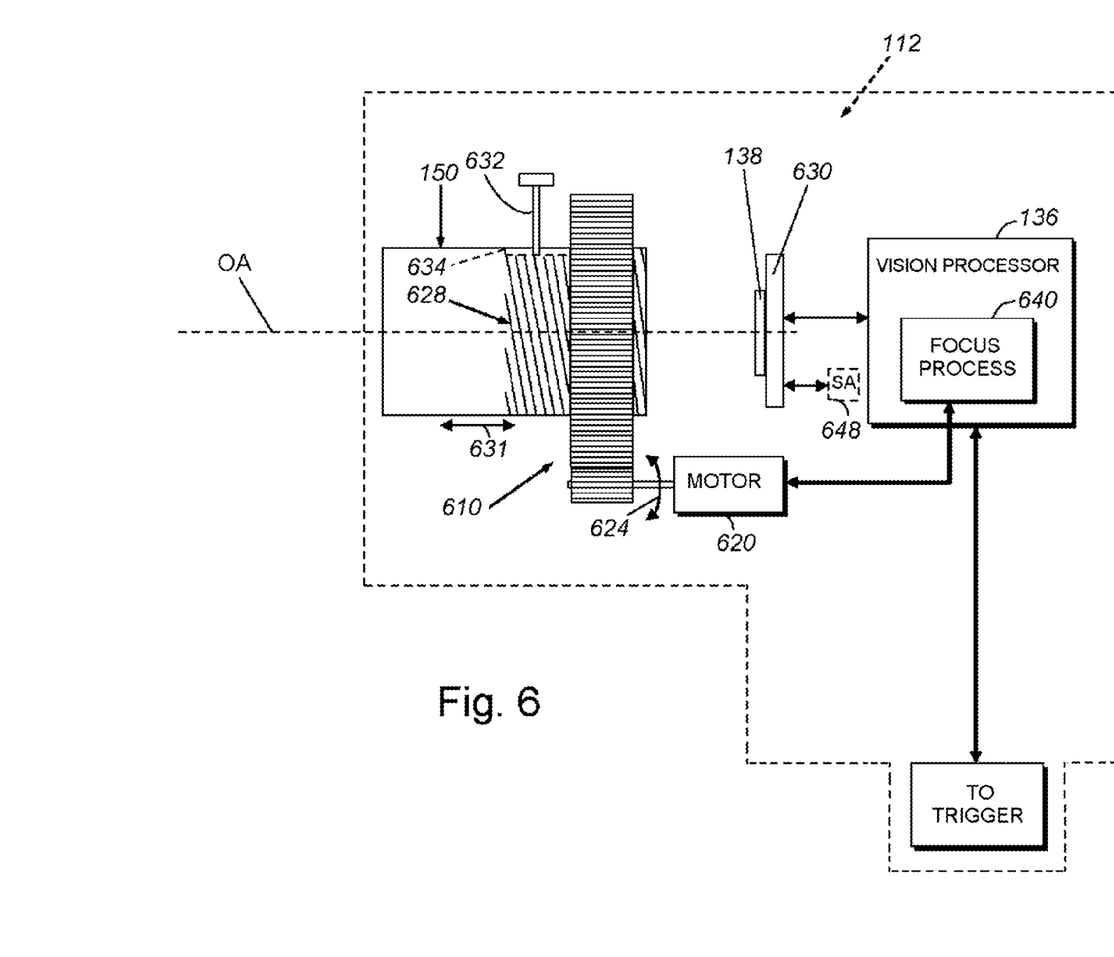
FIG. 6 is a diagram of a lens focus mechanism and associated processors for processing image data and controlling focus of the lens assembly in the reader of FIG. 1.

With reference now to FIG. 6, an exemplary focus mechanism 610 for moving the lens assembly 150 along the optical axis OA, toward and away from the sensor 138 (shown mounted on an associated imager circuit board that defines the base of a sensor assembly 630) is depicted. Note that the depicted mechanism 610 is exemplary of a wide variety of possible focus-adjustment mechanisms, others implementations of which should be clear to those of skill in the art. In this exemplary embodiment, the mechanism 610 includes an actuator in the form of a motor (e.g. a servo or stepper motor) 620 having appropriate torque, and where desired, gear reduction to rotate a pinion gear 622 in each of opposing rotational directions (double arrow 624). The motor rotates a large gear 626 having an inner perimeter that is enmeshed with the outer surface of the lens assembly by mating threads 628 that can include a relatively shallow pitch. As the gear 626 rotates based upon the drive of the motor, it causes the lens assembly to move toward or away (double arrow 631) from the sensor 630 assembly and associated sensor image plane. In this embodiment, an anti-rotation pin 632, which is fixed to the housing body 112, engages an axially-aligned slot 634 in the lens assembly 150 to prevent rotation of the lens. In this manner rotation of the gear is fully translated intro linear motion of the lens assembly along the axis OA. A variety of alternate anti-rotation arrangement can be employed in this implementation. Alternatively the lens can be rotated and a fixed, threaded base (substituting for a rotating gear 626) can be used to generate linear translation in the lens assembly 150 with respect to the sensor. In further embodiments, the lens can be fixed and the sensor can be provided on an axially moving base. In general, the system defines relative motion between the lens assembly 150 and sensor/image plane (138).

The axial position of the lens assembly 150 is determined by the proper focus of the projected image on the sensor 138. In an embodiment, the on-board vision processor 136 includes a focus process 640 that can employ conventional techniques to determine when an image comes into sharp focus. For example, the contrast fall-off at edges in acquired images can be employed. In the focus process 640, the constant magnification lens assembly 150 is moved (in its entirety as a fixed front lens L1, rear lens L2 and aperture stop AS) by the motor 620 through a multiplicity of position steps, and the process 640 determines the best focus position based upon certain metrics in the acquired images. Other techniques for focusing the lens are expressly contemplated—for example, sweeping through lens positions or employing a distance sensor and/or range finder can be employed to determine the distance to the object/imaged scene and move the lend to a predetermined setting. The lens position setting can be based, for example, on a formula or look-up table that uses the sensed distance to determine a lens position setting.

With further reference to FIG. 6, it is expressly contemplated that the constant magnificent lens assembly 150 can be fixed with respect to body/frame of the camera. In such embodiments, the sensor assembly 630 (or a portion thereof (e.g. the sensor 138)) can be moved along the optical axis OA toward and away from the fixed-position constant magnification lens assembly 150. An appropriate sensor actuator (SA) (shown in phantom as box 648) can be used to move the sensor assembly 630 as indicated by the associated double arrow. Any acceptable actuation mechanism can be used including (but not limited to) electrically powered worm drives, gear drives and/or linear motors. Focus processes, as described generally above (e.g., stepping, sweeping, sensing distance, etc.), can be used to set the appropriate sensor position with respect to the fixed, constant magnification lens assembly.

III. Constant Magnification Focus Process

Figure 7:
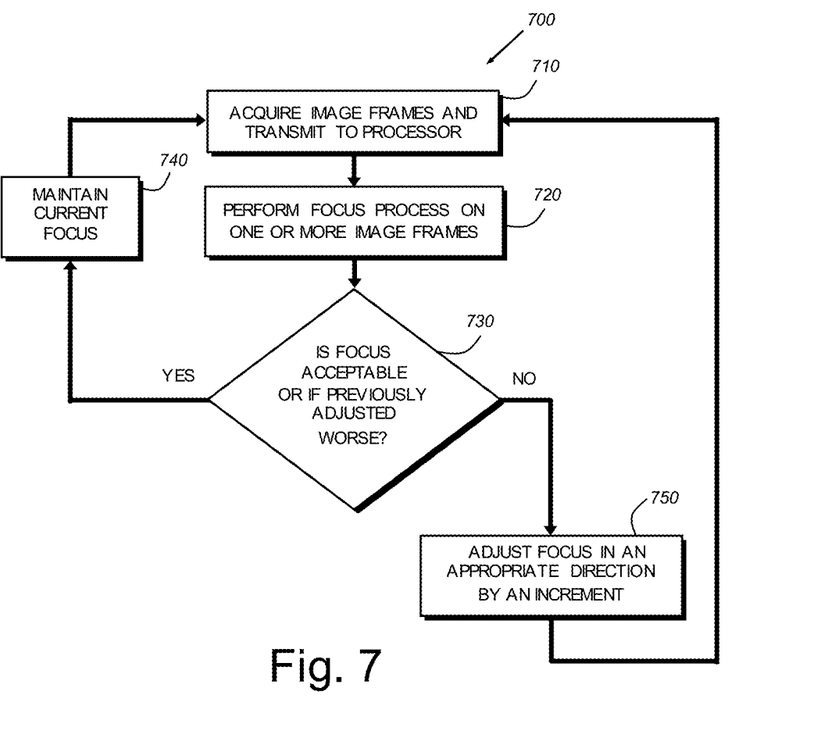
FIG. 7 is a flow diagram of an exemplary focus process using the lens assembly in the reader of FIG. 1.

With brief reference to FIG. 7, an illustrative procedure 700 for adjusting focus of the constant magnification lens assembly is shown. This procedure 700 is a simplified example of any acceptable procedure for adjusting focus during setup and/or runtime. In step 710, the sensor acquires one or more image frames of the scene and transmits these image frames to the vision processor. Among other processes, the processor performs the focus process (640 in FIG. 6) to determine whether the image is sufficiently resolved (step 720). If the image is sufficiently resolved (for example, a symbol can be decoded), then decision step 730 allows focus to be set at the current setting (step 740). If focus is unacceptable, or worse than that achieved in a previous adjustment of the lens assembly, then the focus process readjusts the lens focus in a predetermined direction over an adjustment increment (step 750). Selection of the predetermined direction form movement of the lens assembly can be based upon a prediction as to which direction will improve focus, or it can be based upon an analysis of the image indicating which direction will achieve better focus. If focus is worse than the previous adjustment, then the direction of adjustment in the next cycle is reversed accordingly. While adjustment can occur in increments, using an iterative process, it is contemplated that a larger adjustment can be made initially based upon a determination as to how "out-of-focus" the image is, and then smaller-sized adjustments can be made until a final focus is achieved. Again, this procedure (700) is exemplary of a wide range of focus-adjustment procedures and/or techniques that should be clear to those of skill in the art.

IV. Constant Magnification Using Liquid Lens

An exemplary lens configuration that can be desirable in certain vision system applications is a so-called liquid lens assembly. One form of commercially available liquid lens, available, for example from Varioptic of France, uses two iso-density liquids—oil is an insulator while water is a conductor—and the principle (phenomenon) of electro wetting to vary the optical power setting of the lens. On example provides an 18-diopter (1/focal length) variable range of optical power. The variation of voltage passed through the lens by surrounding circuitry leads to a change of curvature of the liquid-liquid interface, which in turn leads to a change of the focal length of the lens. Some significant advantages in the use of a liquid lens are the lens' ruggedness (it is free of mechanical moving parts), its fast response times, its relatively good optical quality, and its low power consumption and size. The use of a liquid lens can desirably simplify installation, setup and maintenance of the vision system by eliminating the need to manually touch the lens. Relative to other autofocus mechanisms, the liquid lens has extremely fast response times. It is also ideal for applications with reading distances that change from object-to-object (surface-to-surface) or during the changeover from the reading of one object to another object.

A recent development in liquid lens technology is available from Optotune AG of Switzerland. This lens utilizes a movable membrane covering a liquid reservoir to vary its focal distance. This lens advantageously provides a larger aperture than competing designs and operates faster. The focal length/distance of an optical system employing liquid lens technology can be varied within a predetermined range (e.g. 20 diopters) based upon the setting of the liquid lens element. This setting is varied by applying force to the perimeter of the membrane using electromagnetic actuation in accordance with known techniques.

Figure 8:
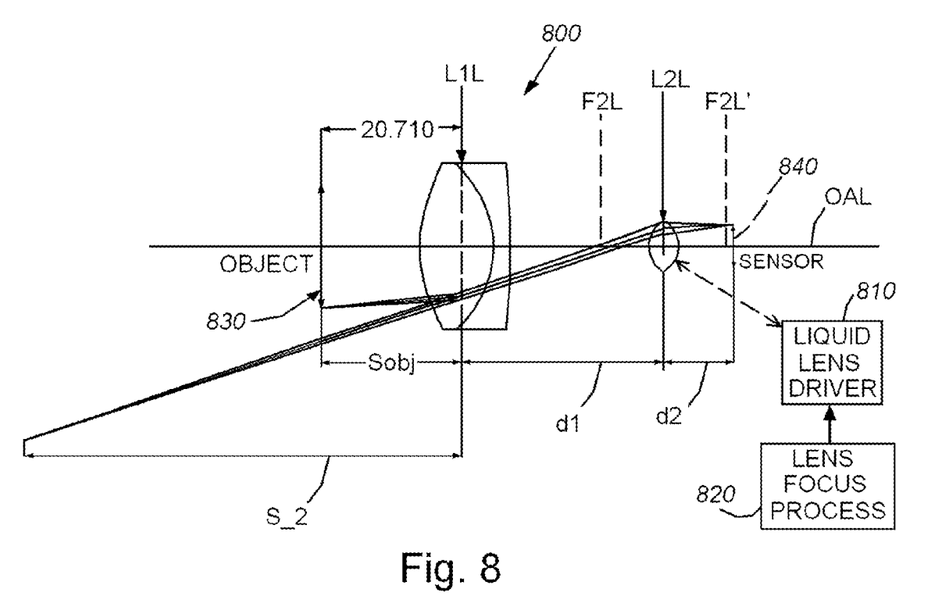
FIG. 8 is a diagram of a lens assembly for a constant magnification vision system including a liquid lens assembly according to an illustrative embodiment.

FIG. 8 depicts a generalized lens system configuration 800 for a vision system (See FIG. 1) including a liquid lens element L2L oriented along an optical axis OAL. In this illustrative arrangement, the overall lens system 800 consists of at least two lenses or two groups of lenses. The first (front) group L1L has a fixed optical power, the second (rear) group L2L consists of, or includes, a liquid lens element with variable optical power. Note that the front lens assembly and the (rear) liquid lens assembly are arranged at a fixed spatial relationship along the optical axis OAL in this embodiment. This liquid lens L2L is driven by a driver or similar processor 810 that provides current to the lens to adjust its focus based upon a lens focus process 820. A complete range of exemplary parameters for the system are provided below. If an exemplary object 830 is placed at a distance Sobj (in this example, approximately 20.710 mm) from the optical plane of the first lens (group) L1L with optical power A1, this lens will project an image at a distance:

$$S\_2 = Sobj/(A1*Sobj-1) \quad \text{(Eq. 1)}$$

By way of non-limiting example, the distance d1 between the respective optical planes of lenses L1L and L2L, and the distance d2 between the optical plane of the liquid lens L2L and image sensor 840 can be fixed. Liquid lens L2L thereby projects this intermediate image onto the sensor 840 if the liquid lens' optical power A_LL is equal to (set to):

$$A\_LL = 1/(S\_2 - d1) + 1/d2 \quad \text{(Eq. 2)}$$

The geometrical magnification m1 of the first lens (group) is equal to:

$$m1 = 1/(A1*S\_obj - 1) \quad \text{(Eq. 3)}$$

and the magnification m2 of the second lens (group) is equal to:

$$m2 = 1/(A\_LL*(S\_2 - d1) - 1) \quad \text{(Eq. 4)}$$

Now the liquid lens L2L is placed into the back focal point of lens L1L, this expression can also be written as d1=1/A1.

Substituting this into the equations (2) and (4), the total magnification M of this system reduces to:

$$M = m1*m2 = d2/d1 \quad \text{(Eq. 5)}$$

where M is the system magnification, m1 is the magnification of the fixed lens group/assembly, m2 is the magnification of the liquid lens group/assembly, d1 is the distance between the respective optical planes of lenses L1L and L2L, and d2 is the distance between the optical plane of the liquid lens L2L and image sensor 840.

Figure 9:
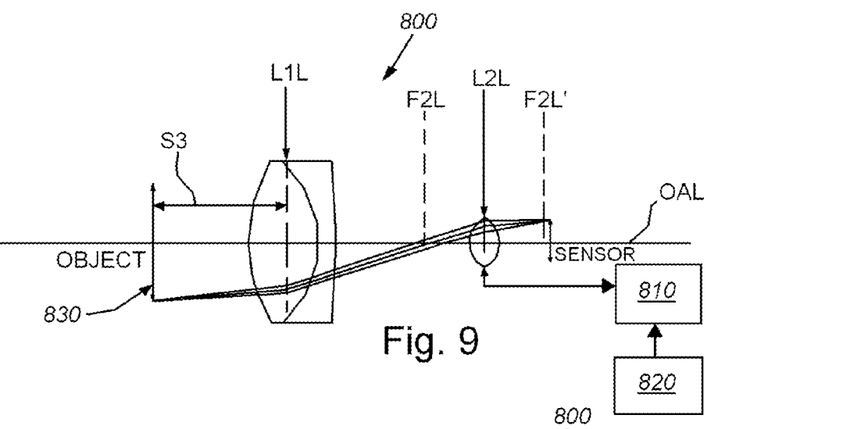
FIGS. 9 and 10 are thin-line ray-trace diagrams of the lens assembly for the constant magnification vision system of FIG. 8, shown maintaining constant magnification on an exemplary object at a nearer and more-distant positioning, respectively, by controlling magnification of the liquid lens assembly.
Figure 10:
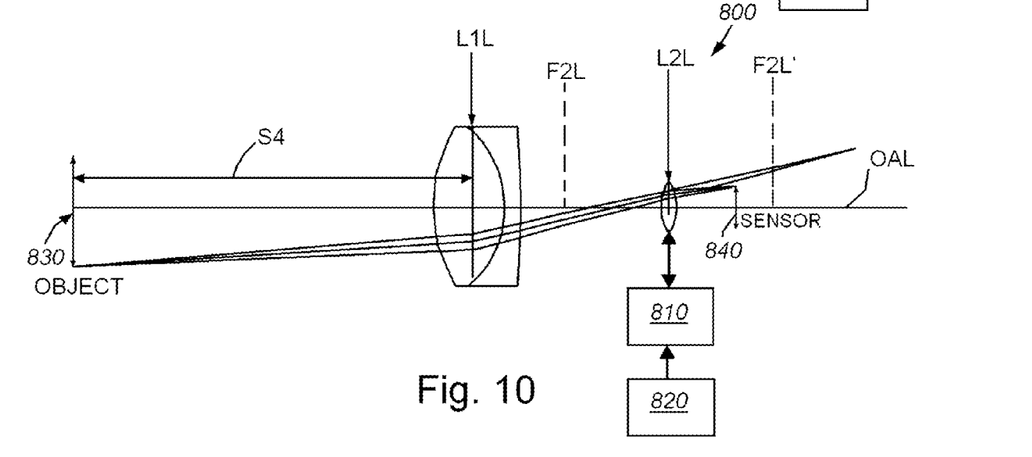

Thus, this arrangement produces a constant magnification that is free of dependence on (independent of) the object distance. FIGS. 9 and 10 each respectively show an exemplary thin-lens ray-trace though the lens arrangement 800 of the system for two different object distances S3 (closer to the optical plane of L1L) and S4 (further from the optical plane of L1*l*). The focal distance F2L and F2L' of the liquid lens L2L is appropriately adjusted by the driver 810 and process 820 to project the focused image at constant magnification M throughout the anticipated range of object distances Sobj.

Thus, by varying the optical power of L2L (m2), the value of M can be maintained at a predetermined level over varying distances of object from the system (Sobj). The value for m2 can be set using a variety of techniques. The above-described focus process 700 can be used to set m2. That is, the power of the lens L2L can be adjusted incrementally (iteratively) until appropriate focus for the selected constant value for M is achieved for the object 830 at a given distance.

Figure 11:
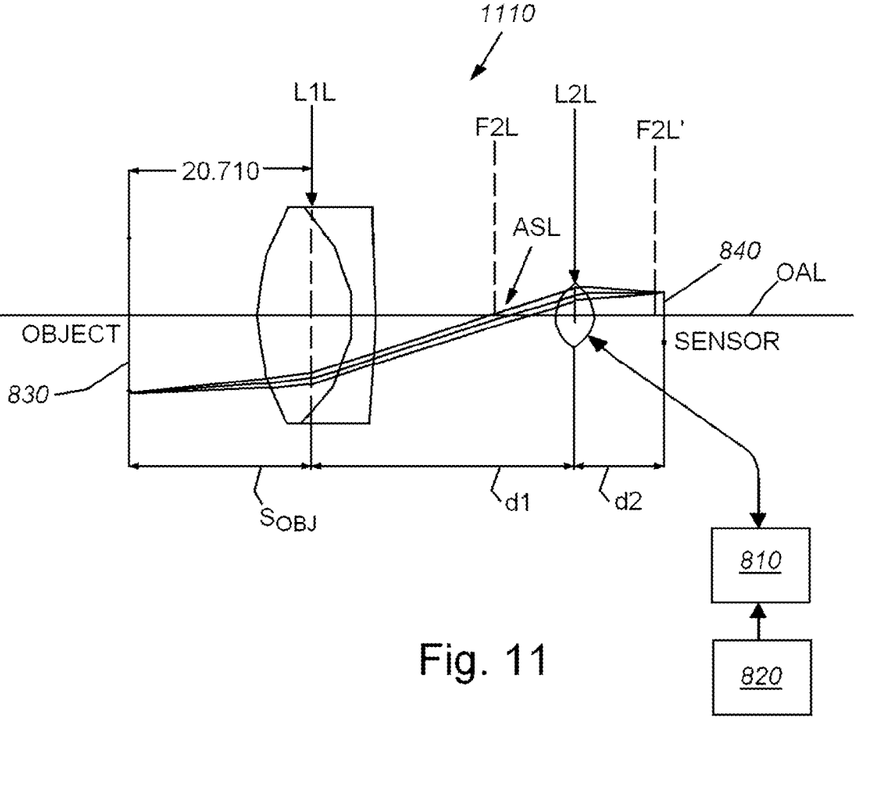
FIG. 11 is a diagram of a lens assembly for a constant magnification vision system including a liquid lens assembly and an aperture stop located between the liquid lens assembly and a front lens assembly according to another illustrative embodiment.

Reference is now made to FIG. 11, which shows a constant magnification lens system 1100 with a liquid lens assembly L2L according to a further embodiment. Elements that are similar in structure and/or function as those described above with reference to FIGS. 8-10 have been provided with like reference numbers. Illustratively, an aperture stop ASL (see also the description above for mechanically moved lenses) can be positioned between the front lens assembly L1L and the rear, liquid lens assembly L2L. The position of this aperture stop ASL along the optical axis OAL defines the size of the lenses (groups/assemblies) L1L and L2L. If the aperture stop ASL is positioned toward the front lens assembly L1L, then the size (diameter) of the liquid lens assembly L2L should be increased. If the aperture stop ASL is, conversely, positioned toward the liquid lens assembly L2L, then the size (diameter) of the front lens assembly L1L should be increased. Currently, commercially available liquid lenses are generally available in smaller diameters, so the aperture stop is generally positioned placed nearer to the liquid lens, or the liquid lens assembly (itself) acts as the aperture stop in the system.

Some generalized parameters for an operational example of a constant magnification lens assembly employing a membrane-type liquid lens are shown and described in the Table as follows:

| | |
|---|---|
| Focal distance of Lens 1 | f1 = 100 mm |
| Closest object distance: | S_near = −200 mm |
| Largest object distance | S_far = −400 mm |
| Intermediate Near Image S2 | S2_near = 200 mm |
| Intermediate FAR*Image S2 | S2_far = 133.333 mm |
| Distance between lenses | d1 = f1 mm |
| L2L to sensor distance | d2 = 20 mm |
| Focal Length of L2L for Near object | f_ll_near = 16.667 mm |
| Optical Power of L2L (Diopter)@Near | A_ll_near = 60 diopter |
| Focal Length of L2L for FAR object | f_ll_far = 12.5 mm |
| Optical Power of L2L (Diopter)@Far | A_ll_Far = 80 diopter |
| Required Optical Power Range of L2L (Diopter) | R = 20 diopter |
| Magnification at NEAR distance | m1_near = −1 |
| | m2_near = 0.2 |
| | M_near = m1 * m2 = −0.2 |
| Magnification at FAR distance | m1_far = −0.333 |
| | m2_far = 0.6 |
| | M_far = m1 * m2 = −0.2 |

It should be clear that the vision system with constant magnification lens described herein advantageously allows for acquisition of images of an area of interest at a wide range of focal distances with adequate detail and relatively straightforward adjustment of the lens assembly. This increases acquisition speed as the distance changes between objects, rendering the system highly suited to handheld vision systems and to fixed-mount vision systems (for example in a moving conveyor line) that can encounter objects of different size and shape (with associated differences in focal distance).

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein various directional and orientation terms such as "vertical", "horizontal", "up", "down", "bottom", "top", "side", "front", "rear", "left", "right", and the like are used only as relative conventions and not as absolute orientations with respect to a fixed coordinate system, such as gravity. Moreover, as used herein, the terms "process" and/or "processor" should be taken broadly to include a variety of electronic hardware and/or software based functions and components. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor here herein can be implemented using electronic hardware, software consisting of a non-transitory computer-readable medium of program instructions, or a combination of hardware and software. Moreover, while the lens assembly is shown as a unit with at least two spatially fixed lenses, and an external actuator, it is expressly contemplated that additional lenses and/or other optical elements e.g. filters) can be provided in alternate embodiments. Also, the lenses of the lens assembly can be individually actuated by separate actuation devices (or a set of gears linked to a common motor. Additionally, actuation can be achieved by alternative mechanisms, such as a linear motor. Moreover, the lens assembly can be removable and/or include a self-contained actuator that is linked to the camera by an appropriate link. In embodiments employing, for example, a liquid lens element, the positioning of the fixed lens assembly at the front and liquid lens assembly at the rear is illustrative only. Where appropriately sized liquid lens assemblies are available, such can be arranged at the front of the assembly, and a fixed (or other) lens assembly can be located at the rear (i.e. more-adjacent to the image sensor and more-distant from the imaged object/scene). Accordingly, this description is meant to be taken only by way of example, and not to otherwise limit the scope of this invention.

What is claimed is:

1. A vision system for acquiring images of objects over a range of focal distances within a field of view comprising:
    an image sensor operatively connected to a vision processor;
    a constant magnification lens assembly oriented along an optical axis that receives light from a scene and transmits the light to the image sensor, the constant magnification lens assembly including a front lens assembly and a rear lens assembly such that an aperture stop of the constant magnification lens assembly is between a back surface of the front lens assembly and a focal point of the front lens assembly; and
    wherein the front lens assembly has a first dimension that is smaller than a second dimension associated with the field of view.

2. The vision system as set forth in claim 1 wherein the front lens assembly and the rear lens assembly are arranged in a fixed spatial relationship therebetween.

3. The vision system as set forth in claim 2 wherein the front lens assembly and the rear lens assembly are constructed and arranged so that (a) a focal point of the front lens assembly and a focal point of the rear lens assembly coincide, (b) a magnification of the assembly is constant and equal to a focal length (f2) of the rear lens assembly/a focal length (f1) of the front lens assembly, and (c) the shift in focal position of the assembly is $(f1/f2)^2$*(distance the constant magnification lens assembly moves along the optical axis).

4. The vision system as set forth in claim 3 wherein the front lens assembly and the rear lens assembly are mounted in a barrel that is moved toward and away from the image sensor by an actuator responsive to a focus process.

5. The vision system as set forth in claim 3 wherein the front lens assembly and the rear lens assembly and the aperture stop are each fixed with respect to each other and further comprising an actuator that moves the image sensor toward and away from the constant magnification lens assembly.

6. The vision system as set forth in claim 2 further comprising a liquid lens assembly oriented between the front lens assembly and the image sensor, wherein the front lens assembly and the rear lens assembly are constructed and arranged so that (a) a focal point of the front lens assembly and the front principal plane of the rear lens assembly coincide (d1=f1), (b) the rear lens assembly has a variable optical power, (c) an aperture stop of the constant magnification lens assembly is located between a back surface of the front lens assembly and a focal point of the front lens assembly, the magnification of the assembly is constant and equal to the ratio between the distance d2 from the rear lens group to the sensor and the distance d1 between the two lens groups.

7. A vision system for acquiring images of an object over a range of focal distances within a field of view comprising:
    an image sensor operatively connected to a vision processor;
    a constant magnification lens assembly oriented along an optical axis that receives light from a scene and transmits the light to the image sensor, the constant magnification lens assembly including a liquid lens assembly oriented between the image sensor and a front lens assembly, the front lens assembly comprising one or more fixed lenses, and the liquid lens assembly including an electrical interface that varies a magnification m2 of the liquid lens assembly,
    wherein the front lens assembly and liquid lens assembly are arranged in a fixed spatial relationship therebetween; and
    a controller that selectively adjusts the magnification m2 of the liquid lens assembly to maintain focus on the object at a constant system magnification M at each focal distance of the range of focal distances, wherein M is defined as a distance between the liquid lens assembly and the image sensor (d2) divided by a distance between the liquid lens assembly and the front lens (d1) such that M=d2/d1.

8. The vision system as set forth in claim 7 wherein the front lens assembly and the liquid lens assembly are constructed and arranged so that (a) a focal point of the front lens assembly and a front principal plane of the liquid lens assembly coincide, and (b) the constant magnification lens assembly is constant and equal to a ratio between the distance (d2) from the liquid lens assembly to the image sensor and the distance (d1) between the front lens assembly and the liquid lens assembly.

9. The vision system as set forth in claim 8 wherein the liquid lens assembly comprises a membrane liquid lens assembly.

10. The vision system as set forth in claim 9 wherein the electrical interface comprises an actuator that varies a shape of the membrane.

11. The vision system as set forth in claim 8 wherein the liquid lens assembly comprises at least two iso-density liquids that vary interaction therebetween in accordance with an electro wetting principle in response to a varied electrical input.

12. The vision system as set forth in claim 7 wherein the controller is arranged to iteratively adjust the magnification m2 of the liquid lens assembly until a desired focus at the constant system magnification M is provided.

13. The vision system as set forth in claim 7 wherein the front lens assembly is smaller in area than an area of the field of view.

14. A method for acquiring images of an object over a range of focal distances within a field of view comprising the steps of:

providing an image sensor operatively connected to a vision processor and a constant magnification lens assembly oriented along an optical axis that receives light from a scene and transmits the light to the image sensor, the constant magnification lens assembly including a front lens assembly and a rear lens assembly such that an aperture stop of the constant magnification lens assembly is between a back surface of the front lens assembly and a focal point of the front lens assembly; and iteratively adjusting the constant magnification lens assembly until the object achieves a desired focus at the image sensor.

15. The method as set forth in claim 14 further comprising locating a liquid lens assembly oriented between the front lens assembly and the image sensor, wherein the front lens assembly and the rear lens assembly are constructed and arranged so that (a) a focal point of the front lens assembly and the front principal plane of the rear lens assembly coincide (d1=f1), (b) the rear lens assembly has a variable optical power, (c) an aperture stop of the constant magnification lens assembly is located between a back surface of the front lens assembly and a focal point of the front lens assembly, d the magnification of the assembly is constant and equal to the ratio between the distance d2 from the rear lens group to the sensor and the distance d1 between the two lens groups.

* * * * *